United States Patent [19]

Jasinski

[11] Patent Number: 4,673,492

[45] Date of Patent: Jun. 16, 1987

[54] GOLD RECOVERY APPARATUS

[76] Inventor: Hubert C. Jasinski, 2nd & Garfield Aves., West Point, Pa. 19486

[21] Appl. No.: 740,499

[22] Filed: Jun. 3, 1985

[51] Int. Cl.⁴ .......................... B07B 3/00; B01D 45/00
[52] U.S. Cl. ..................................... 209/477; 209/471; 209/506; 55/274; 55/320; 55/395; 55/422; 55/440; 55/DIG. 18
[58] Field of Search ............... 209/471, 472, 477, 479, 209/483, 480, 134, 135, 156, 506, 202, 206, 458, 485; 55/443, 439, 434, 440, 278, 320, 328, 318, 278, 422, 464, 419, 274, 392, 394, 395, 464, DIG. 18

[56] References Cited

U.S. PATENT DOCUMENTS

| 234,565 | 11/1880 | Hall ..................................... 209/471 |
| 477,373 | 6/1892 | Kat ..................................... 209/458 X |
| 853,917 | 5/1907 | Clifford et al. .................. 209/422 X |
| 877,411 | 1/1908 | Custer .............................. 209/471 X |
| 2,129,874 | 9/1938 | Ross ..................................... 209/477 |
| 2,161,728 | 6/1939 | Stout ...................................... 55/320 |
| 3,484,772 | 12/1969 | Niewyk et al. .................... 55/274 X |
| 3,543,325 | 12/1970 | Hamrick ........................... 55/320 X |
| 3,953,183 | 4/1976 | Regehr ................................... 55/440 |
| 4,063,913 | 12/1977 | Kippel et al. ......................... 55/274 |
| 4,175,938 | 11/1979 | Regehr et al. ........................ 55/440 |
| 4,227,902 | 9/1980 | Olson ................................ 55/419 X |

FOREIGN PATENT DOCUMENTS

| 257368 | 5/1912 | Fed. Rep. of Germany ........ 55/440 |
| 2450002 | 5/1976 | Fed. Rep. of Germany ........ 55/440 |

Primary Examiner—S. Leon Bashore
Assistant Examiner—Thomas M. Lithgow
Attorney, Agent, or Firm—Joseph W. Molasky

[57] ABSTRACT

An apparatus for recovering gold from gold-containing mixtures by forming a gaseous effluent of said mixture and bringing it into contact with baffles which are arcuately disposed in series so as to divert the gold onto collecting trays. The trays are disposed within a chamber in such manner as to create pathways for the effluent so that divergent streams of said effluent are directed to the baffles to enhance the recovery operation.

8 Claims, 6 Drawing Figures

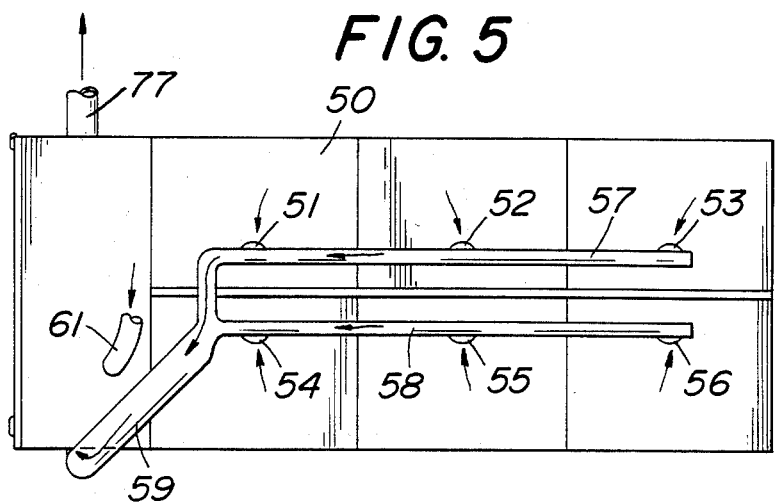
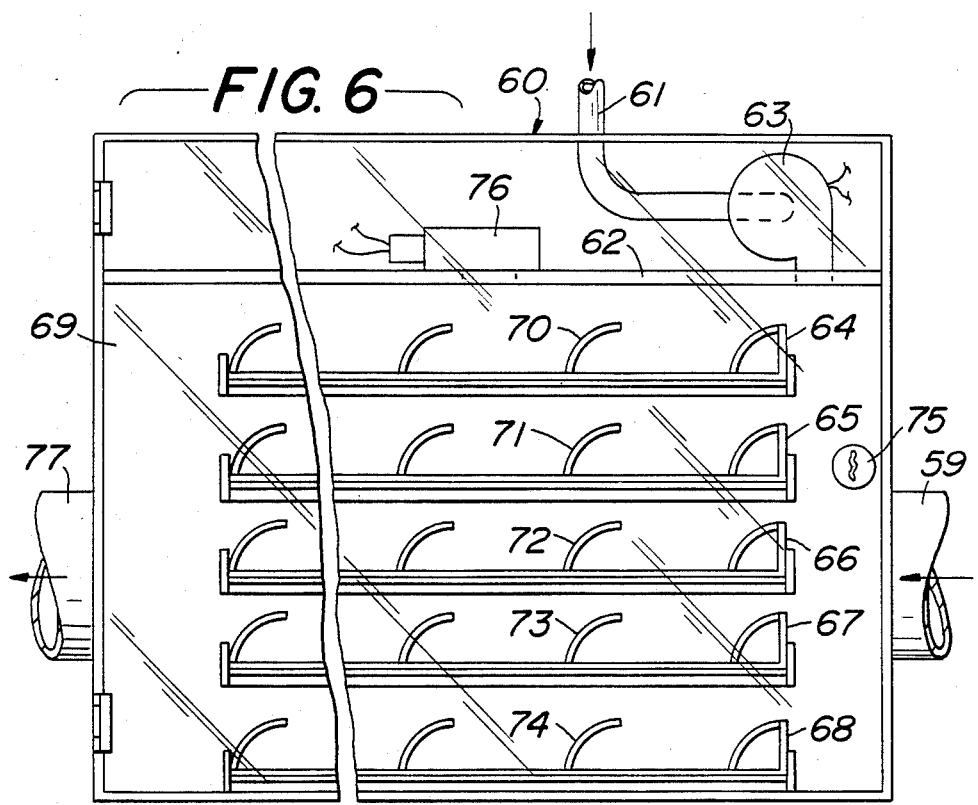

GOLD RECOVERY APPARATUS

This invention relates to an apparatus for recovering gold from a mixture in which several components are present in finely divided form.

One object is to separate gold from other particulate matter as, for example, dust, powdered plastic and less heavy metals.

By virtue of this invention it is now possible to extract gold from mixtures in which the components are present in finely divided form by feeding the mixture to a separator which extracts from the composite even minor concentrations of precious metal.

Moreover, the apparatus of this invention is relatively inexpensive to operate and it may be employed continuously to remove from fine mixtures essentially all of the available gold.

This invention should be of interest to dentists, dental technicians and jewelers because gold tailings are a by-product of their profession and the apparatus hereinafter described will allow these artisans to retrieve a large proportion of this precious metal.

This invention is also efficient because it allows the operator to vacuum the gold-containing residues directly into a conduit where it combines with air to form an effluent which is conveyed to a gold separator. The conduit should be readily accessible because the residues are finely powdered materials which scatter easily and any attempt to transport them will result in a loss of materials, inefficiencies in operation and a decrease in recovery rates.

In the separator the gold-containing effluent is brought into contact with baffles which interrupt the effluent stream and separate out the precious metal by diverting the gold particles onto a collecting tray. The extraneous material such as dust, powdered plastic and refuse remains in the stream and it is expelled through an exhaust conduit.

In practice, the stepwise method for separating the gold particles consists essentially of combining the gold-containing residues with air to form a gaseous effluent and conveying the effluent under vacuum to a gold separation chamber. Upon reaching the chamber the effluent is emmited through an inlet port as a horizontal stream where it comes into contact with baffles or vanes which are serially arranged to interrupt the effluent flow and divert the gold particles onto the collecting tray. After the process has been terminated the trays are removed and the gold deposit is collected.

BACKGROUND

The literature is replete with attempts to reclaim gold from ores and coarse mixtures which contain this precious metal in varying amounts.

Various filter systems have been proposed but these have proven unsuccessful because the gold and the refuse have essentially identical particle sizes and the filter cannot selectively separate one particle from another. As a result, the filters soon become coated with a mixture of both gold and refuse and meaningful recovery is made impossible to achieve.

In U.S. Pat. No. 443,901 E. Craig describes an apparatus for separating gold and silver from ores by subjecting the mixture to a column of horizontally moving air so that the particles are blown into separate bins each according to its own weight and specific gravity.

Unfortunately, the Craig apparatus relates solely to the treatment of low-grade ores and it has no application to finely powdered mixtures. Moreover, Craig requires that air jets be directed upwardly through the ore so as to avoid the premature deposit of particles into the receiving bins.

The use of air jets may be necessary or desirable in separating large ore pieces but such means is counterproductive in separating finely divided particles from one another because the turbulence which they create makes it impossible for the particles to settle out in collectible quantities.

L. Soulages describes in U.S. Pat. No. 244,114 a system for separating heavy ore components from lighter ones by directing a draft of air across a flowing stream of ore. The heavier components fall into a first hopper and the lighter particles fall into succeeding hoppers.

This apparatus relies solely upon gravity separation and it is useful where large ore pieces are sought to be graded but it has no application in the case of finely divided particles.

In U.S. Pat. No. 366,923 E. Butler also directs air against a stream of ore but, again, no effluent is formed and there is no provision for separating and collecting gold particles from a mixture of finely divided components.

Accordingly, neither filter systems or the known gravity-type separators are capable of separating gold particles from mixtures in which the components are all present in a finely divided form.

THE INVENTION

This invention relates to an apparatus for separating gold from gold-containing mixtures in an efficient and inexpensive manner.

More particularly, this invention provides means for recovering gold in particulate form from the tailings obtained while performing dental restoration operations.

Gold is too ductile and too expensive to be used exclusively in dental work but it is combined with less precious metals to form amalgams which are valued for their efficacy and durability. The concentration of gold in such amalgams can be appreciable and the value of gold has risen so steadily that there is a heightened interest in its recovery; however, there is at present no practical or cost-effective means for achieving this result.

It is an object of this invention to provide an apparatus and means for recovering gold from residues obtained during the restoration of teeth and the fabrication of dental prosthetic replicas. This apparatus is portable and, therefore, the recovery process can be conducted on location, that is, wherever the residues are generated and as a continuous process. Moreover, the apparatus is convenient to use because it is only necessary to combine the residues with air under suction and convey the effluent to a separation or recovery chamber.

In the Periodic Table of Elements gold ranks among the heaviest of the precious metals; heavier even than platinum and silver and this property is employed to advantage in the present invention by bringing the gold-containing effluent into contact with vanes which deflect the gold particles onto a receiving tray while allowing most lighter components to be swept away.

The apparatus of this invention is employed by conveying the gold-containing effluent under suction to a separation chamber where the effluent comes into contact with a stack of removable trays positioned one above the other. Each tray is equipped with a plurality of vanes which are serially and arcuately disposed in the direction of the inlet pipe so that the gold particles will be deflected downwardly on contact. This operation diverts the gold particles onto a tray from which they are collected as a deposit.

After the effluent gases have circulated within the chamber the divergent streams converge and they are swept away through an outlet port.

Beneath the centrally disposed stack of trays is a base tray which collects those gold particles which travel downwardly because of their size and weight.

This invention will now be described with particularity by reference to the Drawings.

THE DRAWINGS

FIG. 5 is a top sectional view of a large scale multiple inlet setup which may be used with the gold separating device of this invention.

FIG. 6 is a sectional side view of a modified gold-separating device according to this invention which may be used with the multiple inlet setup of FIG. 5.

This invention will now be described by reference to precise apparatus embodiments and to the method by which this apparatus may be employed.

THE EMBODIMENTS

Figure 1:
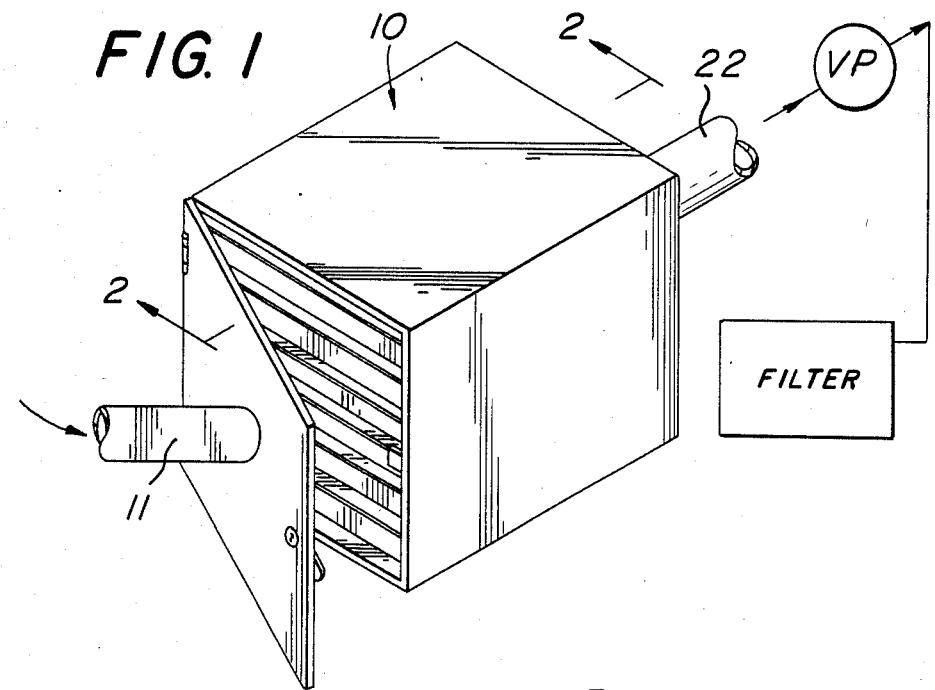
FIG. 1 is a perspective view of the gold-separating device of this invention.
Figure 2:
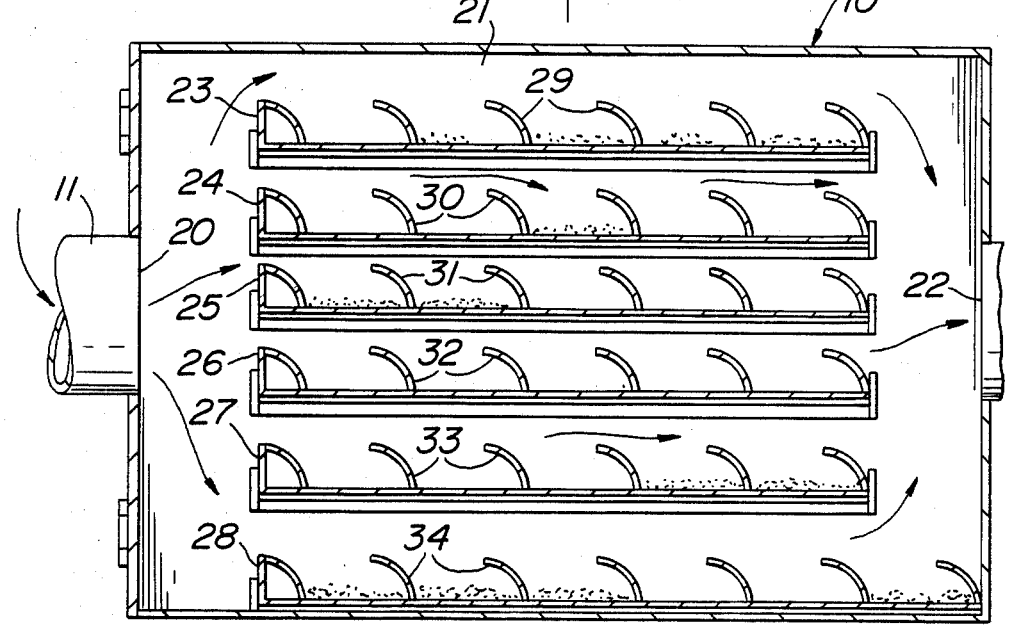
FIG. 2 is a sectional view of the device of FIG. 1 taken on line 2—2.

The gold-containing mixture is conveyed from its source (Not shown) through a conduit 11 by a continuous stream of vacuum air. Upon reaching the separator 10 the gold-containing effluent is impelled through the inlet port 20 and into the separation chamber 21 in a lateral flow where it comes into contact with trays 23-28 and separates into the divergent streams shown by the arrows in FIG. 2.

Figure 3:
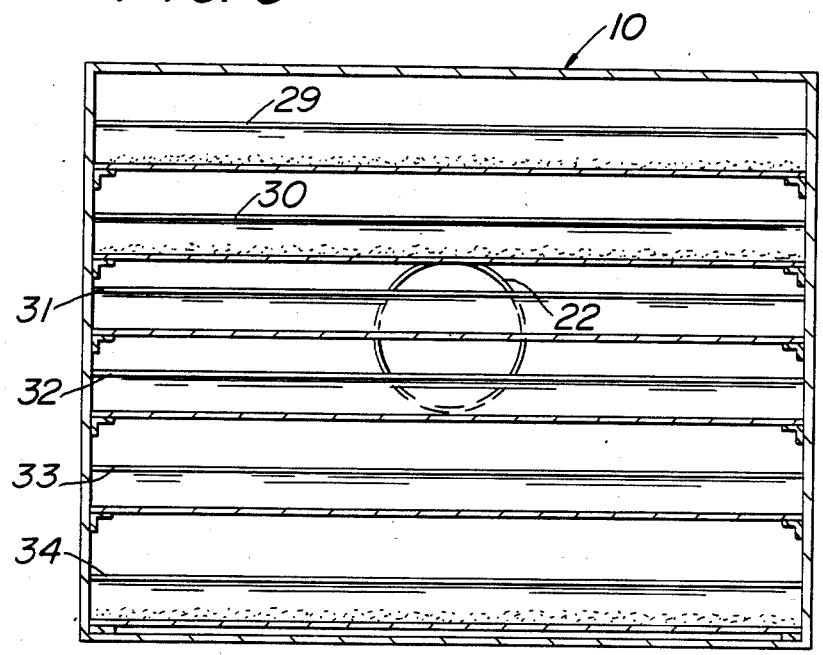
FIG. 3 is a sectional view of the device of FIG. 2 taken on line 3—3.

The trays identified as 23-27 are centrally disposed within the separation chamber in a stackwise manner so as to create pathways through which the divergent streams must flow before they converge and exit through outlet port 22 (FIG. 3). In following these pathways the gold-containing streams come into contact with arcuately disposed vanes 29-34 which deflect the gold particles downwardly onto the floor of the tray.

To ensure that the effluent is cleansed of its gold particles the trays are arranged in such manner as to create a baffle effect.

Those trays which are essentially parallel to the inlet port, that is, trays 24-26, are positioned closely together so that the gaseous stream emitted from inlet port 20 will not only pass therebetween but will also be deflected upwardly and downwardly toward the peripheral trays 23 and 27. The effect of this arrangement is to create several pathways for the gold-containing currents. Trays 24-26, for example, are positioned so closely together that their interstices admit gold particles of only a fine dimension while allowing the gaseous streams to flow evenly.

The larger gold fragments follow a downward path and these are collected by vanes 33 and 34 in trays 27 and 28. The tray on the floor of chamber 21 extends laterally to sidewall 37 to provide enhanced particle-entrappment capabilities. If desired this tray 28 may also be extended laterally in the opposite direction to cover the entire floor and thus facilitate the collection operation.

The most finely divided gold particles, on the other hand, rise upwardly with the circulating currents and these are caught by vanes 29 of tray 23. The finely divided non-gold particles are conveyed through the outlet port 22 and can be removed from the air by the use of a filter.

Figure 4:
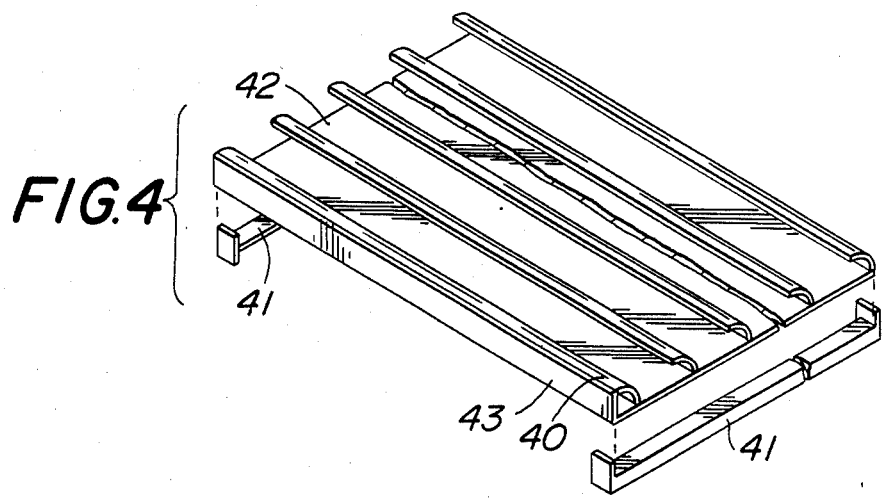
FIG. 4 is a broken perspective view of a removable tray which forms a part of the present device.

The recovered gold is removed by simply withdrawing each tray from its respective support 41 (FIG. 4) and emptying the contents into a container for processing. The particles which are diverted onto the trays have a tendency to collect at the base of the vanes on which they impinge and, therefore, it may be necessary to sweep them clean in order to ensure a complete recovery. To facilitate this recovery step a cowl 40 covers the juncture formed by tray 42 and the perpendicular bar 43 so that gold particles will not become entrapped along the juncture line (FIG. 4). After the tray 40 has been relieved of its contents it is returned to the chamber 21 to await the next recovery operation.

FIG. 5 illustrates a laboratory bench setup 50 which may be used by dental technicians and artisans engaged in the fabrication of prosthetic devices and artifacts comprised of precious metals. The bench is equipped with a plurality of inlet ports 51-56 connected to a vacuum source so that the operator can dispose of the metal tailings which are produced during the fabrication process.

A blower assembly (Not shown) generates the suction needed to create the vacuum and this unit is preferably located some distance from the laboratory as, for example, in the basement, attic or outdoors so that the noise and dust which is associated with its operation will not constitute a hazard or adversely affect the environment. A 1.5 horsepower motor is sufficient to generate the suction required to operate a 6 port facility of the type shown in FIG. 5.

The tailings or gold dust which is indrafted into ports 51-56 is conveyed via the conduits 57 and 58 into a central duct 59 through which the material is impelled into the separator identified as 60 in FIG. 6.

One ancillary feature of the apparatus shown in FIG. 6 is a vacuum attachment (Not shown) which can be used to retrieve gold particles from remote locations as, for example, gold dust which may have fallen to the floor or into drawers or which lies as a coating on lathes or other equipment. A motor 63 (FIG. 6) generates the suction needed to operate the vacuum attachment and impel the gold dust into the separation chamber via hose 61. Exhaust air is emitted from the separation chamber and into the atmosphere via conduit 77. This recovery is beyond the ability of the inlet ports 51-56 to achieve and the vacuum attachment thus allows the operator to collect those precious metal particles which might otherwise be lost.

The apparatus shown in FIG. 6 is a sectional view of a gold dust separator 60 which may be used with the multiple inlet port setup of FIG. 5. The gold-containing effluent stream is impelled into the separation chamber via the conduit 59 so that it can be brought into contact with vanes 70-74 of collecting trays 64-68.

The trays are disposed in such manner as to create pathways for the incoming stream so that the gold particles which come into contact with vanes 70-74 are diverted downwardly onto the floor of the tray. The gold thus obtained is collected by withdrawing each tray from the chamber and emptying the contents into a container for further processing.

The apparatus of FIG. 6 includes features which make it desirable for use in laboratories where convenience and security are mandated. A transparent plastic door 69 allows the operator to view the recovery process so that the trays can be emptied after they have been filled to capacity. A lock 75 secures the door and a lamp 76 on support 62 provides a lighting means for viewing the interior of the chamber.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A non-oscillatory device for separating gold particles from a gold-containing mixture of particles comprising:
    (1) a separation chamber having sidewalls and upper and lower walls;
    (2) means defining an inlet port from which gold containing mixtures are impelled into said separation chamber under vacuum in the form of an effluent, said inlet port being centrally located in a front sidewall of said chamber;
    (3) means defining an outlet port for carrying away from said chamber exhaust air and unwanted particulate matter, said outlet port being located in a rear sidewall of said chamber directly opposite said inlet port;
    (4) vacuum means for conveying an effluent under vacuum into said inlet port and out of said outlet port;
    (5) a stack of removable trays supported one above the other inside said separation chamber defining, said stack of trays define a plurality of flow paths between said trays, each tray being equipped with a plurality of curved vane means which individually extend perpendicular to the line defined between the inlet port and the outlet port and which serve to divert the gold particles in said mixture onto said trays, said trays extending substantially across the width of the chamber and being longitudinally shorter than said chamber so as to define an open area between said front sidewall and said trays, and said rear sidewall and said trays, the trays located near the inlet and outlet ports being further positioned so as to be closer to each other than to the trays near the upper and lower walls.

2. The device of claim 1 wherein said trays are centrally disposed within said chamber to afford an open course for the stream of air and provide pathways for the even distribution of the gold dust mixture.

3. The device of claim 1 wherein the outlet pipe is equipped with a filter for removing particulate matter from the exhaust air.

4. The device of claim 1 wherein the stack of trays includes a tray which is located on the floor of said chamber immediately beneath the remainder of removable trays and said floor tray extends longitudinally to the rear sidewall, the plurality of curved vane means on each tray which collectively are serially arranged on each tray in the direction of the conveyed effluent, are each arcuately disposed in the direction of the inlet port.

5. The device of claim 1 wherein the separation chamber is constructed of transparent materials.

6. The device of claim 5 wherein a lamp provides light for viewing the recovered gold particles within the separation chamber.

7. A method for separating gold from a gold-containing mixture of particles which comprises:
    (1) combining said gold-containing mixture with air under vacuum to form a gaseous effluent;
    (2) conveying said effluent to a non-oscillatory device consisting essentially of:
        (a) a separation chamber having sidewalls and upper and lower walls;
        (b) means defining an inlet port from which gold containing mixtures are impelled into said separation chamber under vacuum in the form of an effluent, said inlet port being centrally located in a front sidewall of said chamber;
        (c) means defining an outlet port for carrying away from said chamber exhaust air and unwanted particulate matter, said outlet port being located in a rear sidewall of said chamber directly opposite said inlet port;
        (d) vacuum means for conveying an effluent under vacuum into said inlet port and out of said outlet port;
        (e) a stack of removable trays supported one above the other in said separation chamber, said stack of trays define a plurality of flow paths between said trays, each tray being equipped with a plurality of curved vane means which individually extend perpendicular to the line defined between the inlet port and the outlet port and which serve to divert the gold particles in said mixture onto said trays, said trays extending substantially across the width of the chamber and being longitudinally shorter than said chamber so as to define an open area between said front sidewall and said trays, and said rear sidewall and said trays, the trays located near the inlet and outlet ports being further positioned so as to be closer to each other than to the trays near the upper and lower walls;
    (3) emitting the effluent into said separation chamber as a horizontal stream where it is brought into contact with said plurality of curved vane means which collectively are arranged serially on each tray in the direction of the effluent stream to interrupt the effluent and divert the gold particles onto removable trays; and
    (4) collecting the gold deposit thus obtained.

8. The method according to claim 7 wherein several gold-containing effluents are emitted simultaneously under a vacuum into said separation chamber.

* * * * *